United States Patent
Schuckle et al.

(10) Patent No.: US 9,766,707 B2
(45) Date of Patent: Sep. 19, 2017

(54) METHOD FOR USING THE GPU TO CREATE HAPTIC FRICTION MAPS

(71) Applicant: DELL PRODUCTS, L.P., Round Rock, TX (US)

(72) Inventors: Richard Schuckle, Austin, TX (US); Thomas P. Lanzoni, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/147,334

(22) Filed: May 5, 2016

(65) Prior Publication Data

US 2016/0246381 A1 Aug. 25, 2016

Related U.S. Application Data

(63) Continuation of application No. 14/691,469, filed on Apr. 20, 2015, now Pat. No. 9,395,818, which is a continuation of application No. 13/609,446, filed on Sep. 11, 2012, now Pat. No. 9,046,925.

(51) Int. Cl.
| | |
|---|---|
| *G06F 3/01* | (2006.01) |
| *G06F 3/0354* | (2013.01) |
| *G06F 3/041* | (2006.01) |
| *G06T 15/00* | (2011.01) |
| *G06T 19/00* | (2011.01) |
| *G06T 1/20* | (2006.01) |
| *G06T 1/60* | (2006.01) |

(52) U.S. Cl.
CPC .......... *G06F 3/016* (2013.01); *G06F 3/03545* (2013.01); *G06F 3/0416* (2013.01); *G06T 1/20* (2013.01); *G06T 1/60* (2013.01); *G06T 15/005* (2013.01); *G06T 19/00* (2013.01)

(58) Field of Classification Search
None
See application file for complete search history.

(56) References Cited

U.S. PATENT DOCUMENTS

| | | | | |
|---|---|---|---|---|
| 6,448,977 | B1* | 9/2002 | Braun | A63F 13/06 345/156 |
| 8,525,778 | B2* | 9/2013 | Colgate | G06F 3/016 345/156 |
| 2006/0109266 | A1* | 5/2006 | Itkowitz | G06F 3/016 345/419 |
| 2006/0192771 | A1 | 8/2006 | Rosenberg et al. | |

(Continued)

*Primary Examiner* — James A Thompson
(74) *Attorney, Agent, or Firm* — Isidore PLLC (57) ABSTRACT

A haptics rendering system comprises: a display device having a display screen and one or more haptic feedback mechanisms associated with at least one tactile output peripheral; and a graphics processing unit (GPU) communicatively coupled to the display device. The GPU: receives one or more portions of display image software code for a three dimensional display image; generates a three dimensional (3D) visual output of the display image for display on the display device; and concurrently generates one or more specific friction maps to provide haptic feedback of depth and/or texture associated with specific portions of the display image that comprise at least one portion having at least one of a different depth and a different texture than other portions of the display image. The GPU renders the display image and the friction map from a same set of 3D commands within the display image software code.

22 Claims, 7 Drawing Sheets

(56) References Cited

U.S. PATENT DOCUMENTS

| | | | |
|---|---|---|---|
| 2009/0006043 A1* | 1/2009 | Petersik | G09B 23/28 |
| | | | 703/1 |
| 2010/0141407 A1 | 6/2010 | Heubel et al. | |
| 2010/0231550 A1* | 9/2010 | Cruz-Hernandez | G06F 3/0488 |
| | | | 345/174 |
| 2011/0109571 A1 | 5/2011 | He et al. | |
| 2011/0157002 A1 | 6/2011 | Liu et al. | |
| 2011/0157003 A1 | 6/2011 | Liu et al. | |
| 2011/0279249 A1 | 11/2011 | Kipman et al. | |
| 2011/0291821 A1 | 12/2011 | Chung | |
| 2012/0028577 A1 | 2/2012 | Rodriguez et al. | |
| 2012/0038471 A1 | 2/2012 | Kim et al. | |
| 2012/0068957 A1 | 3/2012 | Puskarich et al. | |
| 2012/0127088 A1 | 5/2012 | Pance et al. | |
| 2013/0300740 A1* | 11/2013 | Snyder | G06F 3/016 |
| | | | 345/420 |

* cited by examiner

METHOD FOR USING THE GPU TO CREATE HAPTIC FRICTION MAPS

RELATED APPLICATIONS

This application is a continuation of U.S. patent application Ser. No. 14/691,469, filed Apr. 20, 2015, which is a continuation of U.S. patent application Ser. No. 13/609,446, filed Sep. 11, 2012, now U.S. Pat. No. 9,046,925, issued Jun. 2, 2015. Both applications are fully incorporated herein by reference.

BACKGROUND

Technical Field

The present disclosure generally relates to display devices utilized with information handling system and in particular to providing improved power efficiency and color accuracy of display devices.

Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many conventional information handling systems, including handheld computers and other handheld consumer devices, occasionally include a touch screen display that is utilized as a tactile/touch input device as well as a visual output device. Additionally, certain of these displays are further designed to provide haptic feedback in the form of vibrations and/or pulses. Other types of haptic peripherals, such as touchpads and haptics mice are also utilized in some applications. However, with the conventional implementation of these devices, the range of sensations that can be provided and/or the ability to provide tactile/tangible output is limited and requires implementation of a separate haptic engine to capture the graphics frame buffer and process the screen image. Currently these conventional methods either require direct software support of the feedback or a set of middleware that monitors the frame buffer and processes the current screen image. This approach is processor-resource intensive and leads to lower battery life in the electronic device. In addition, this approach has limitations on the range of friction scenarios that can be extracted from the screen image.

BRIEF SUMMARY

Disclosed are a method and rendering system for providing sensations of surface texture and depth and/or height dimensions associated with a three dimensional (3D) display image presented on a touch screen display by using the graphical processing unit (GPU) to create and/or render separate friction maps and/or texture maps correlated to the display image. Also disclosed is an information handling system configured with a GPU and haptics subsystem that renders the texture and depth/height dimensions by creating friction maps that trigger specific sensations associated with surfaces of objects within the display image.

According to one embodiment, the information handling system comprises: a processor capable of executing software code; at least one haptic peripheral, including one or more of a touchpad, a haptics mouse, and a touch screen display device having a display screen, a next generation haptics peripheral; one or more haptic feedback mechanisms associated with the at least one haptic peripheral and disposed proximate to the associated haptic peripheral for generating one or more sensations associated with a display image; and a graphics processing unit (GPU) communicatively coupled to the processor and to the display device. The GPU: receives one or more portions of the software code corresponding to the display image; and generates a three dimensional (3D) visual output of the display image for display on the display device. The three dimensional visual output contains a width, height and a depth dimension, respectively representing x, y, and z planes. The GPU also concurrently generates one or more specific friction maps to provide haptic feedback associated with specific portions of the display image that comprise at least one portion having at least one of a different depth and a different texture than other portions of the display image. According to one aspect, the GPU renders the display image and the friction map from a same set of 3D commands within display image software code received from one or more of the processor and a display data input source.

According to a second embodiment, the method comprises: the GPU receiving one or more portions of software code corresponding to a display image; generating a three dimensional (3D) visual output of the display image for display on the display device; and concurrently generating one or more specific friction maps to provide haptic feedback associated with specific portions of the display image that comprise at least one portion having at least one of a different depth and a different texture than other portions of the display image. Also, the method comprises the GPU rendering the display image and the friction map from a same set of 3D commands received from one or more of a processor of the information handling system and a display data input source. According to one aspect, the method further comprises: creating the friction map utilizing a z-level function, wherein an amount of friction is correlated to a closeness on a depth-plane of a surface of an object within the display image relative to a background plane of the display image. According to yet another aspect, the method comprises: passing the generated friction map to a haptic friction buffer to trigger the haptic subsystem to: process the generated friction map within the haptic friction buffer; and in response to detecting a contact between an image interface tool and the haptic device (e.g., passing of a screen interface stylus or finger, across the touch screen of the display device), apply a haptic response (such as a vibration) to represent edges and surfaces of objects visually represented that are at a higher depth dimension than the background plane of the display image. The method further comprises: generating the haptic map with depth/height dimension parameter values, which trigger an increase in a haptic response, such as a higher vibration intensity, at one or more points of the display image in response to functional interfacing of the image interface tool at a location of the display screen at which a surface of an object within the display image is visibly closer in a depth-plane than a background of the display image, where an amount of increase in the feedback (e.g., vibration) intensity correlates to a height of the surface of the object relative to the background; and changing, via the haptic subsystem, an intensity of the feedback (e.g., vibration) based on a relative depth dimension of each point of an object over which the image interface tool functionally interfaces (i.e., indirectly interfacing via an on-screen cursor). Accordingly, a higher object on a z-plane triggers more intense haptic response (e.g., greater vibration intensity) than a lower object on the z-plane, and objects that appear closer in the display image are provided with a perceived/sensed higher level of resistance to a detected contact of the screen interface stylus at that location of the display screen.

According to another aspect of the second embodiment, the method comprises: receiving within display image software code an indication of specific friction textures to assign to one or more rendered objects; generating the haptic map, based on the received software code indications, to include one or more parameter values that represent the specific friction textures to apply to a surface of each of the one or more rendered objects to enable an image interface tool to detect the specific friction texture of each of the one or more rendered objects; and providing within the haptic map one or more parameter values that represent different textures. The different textures are applied to one or more of a surface of an object within a window and an entire window to enable an image interface tool to detect an applied texture across an entire surface of the object and the window. Also, according to one aspect, the method provides that the GPU renders the display image, places the display image in a normal frame buffer for display, and places one of the display image and the haptic map correlated to the display image into a texture buffer, whose contents are passed to the haptics subsystem for mapping onto a touch-haptics device.

In accordance with a third embodiment, a three dimensional (3D) texture and haptics rendering system comprises: a display device having a display screen; at least one haptic peripheral, including one or more of a touch screen, a touchpad, a haptics mice and a next generation haptics device; one or more haptic feedback mechanisms associated with a respective haptic peripheral and disposed proximate to the haptics peripheral for generating one or more sensations associated with a display image; and a graphics processing unit (GPU) communicatively coupled to the display device. The GPU (a) receives one or more portions of the display image software code of a three dimensional display image, (b) generates a three dimensional (3D) visual output of the display image for display on the display device, and (c) concurrently generates one or more specific friction maps to provide haptic feedback associated with specific portions of the display image that comprise at least one portion having at least one of a different depth and a different texture than other portions of the display image. The GPU renders the display image and the friction map from a same set of 3D commands within the display image software code.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method and a rendering system for providing sensations of surface texture and depth and/or height dimensions associated with a three dimensional (3D) display image presented on a touch screen display by using the graphical processing unit (GPU) to create and/or render friction and/or texture maps correlated to the display image. Also disclosed is an information handling system configured with a GPU and haptics subsystem that renders the texture and depth/height dimensions by creating friction maps that trigger specific sensations associated with surfaces of objects within the display image. According to one embodiment, a three dimensional (3D) graphics rendering system comprises: at least one haptic peripheral, including one or more of a touchpad, a haptics mouse, and a touch screen display device having a display screen, and a next generation haptics peripheral; one or more haptic feedback mechanisms associated with the at least one haptic peripheral and disposed proximate to the associated haptic peripheral for generating one or more sensations associated with a display image; and a graphics processing unit (GPU) communicatively coupled to the display device. The GPU: receives one or more portions of display image software code for a three dimensional display image; generates a three dimensional (3D) visual output of the display image for display on the display device; and concurrently generates one or more specific friction maps to provide haptic feedback of depth and/or texture associated with specific portions of the display image that comprise at least one portion having at least one of a different depth and a different texture than other portions of the display image. The GPU renders the display image and the friction map from a same set of 3D commands within the display image software code.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Various aspects of the disclosure are described from the perspective of an information handling system and a display device of or for use with an information handling system. For purposes of this disclosure, an information handling system, such as information handling system 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
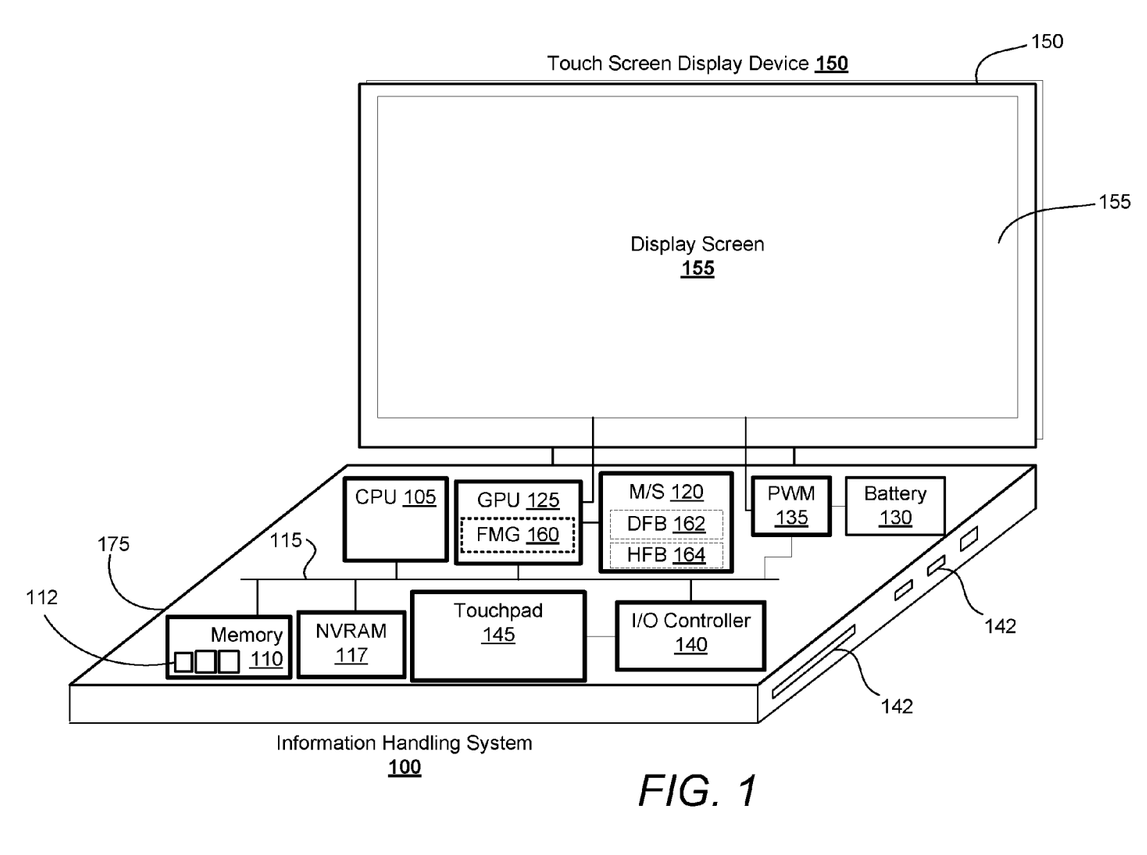
FIG. 1 illustrates an example information handling system, within which several of the features of the disclosed embodiments can be implemented, according to one or more embodiments.

With reference now to the figures, and beginning with FIG. 1, there is depicted a block diagram representation of an example information handling system 100, within which one or more of the described features of the various embodiments of the disclosure can be implemented. Information handling system 100 includes at least one central processing unit (CPU) or processor 105 coupled to system memory 110 via system interconnect 115. Also coupled to CPU 105 via system interconnect 115 is a graphics processing unit (GPU) 125 with associated firmware/drivers, which can include a friction map generating (FMG) utility 160, in one embodiment. System interconnect 115 can be interchangeably referred to as a system bus, in one or more embodiments. Also coupled to system interconnect 115 is nonvolatile storage (NVRAM) 117, within which can be stored one or more software and/or firmware modules and one or more sets of data, such as display image software code, that can be utilized during operations of information handling system 100. These one or more software and/or firmware modules can be loaded into system memory 110 during operation of IHS 100. Specifically, in one embodiment, system memory 110 can include therein a plurality of such modules, including one or more of firmware (F/W), basic input/output system (BIOS), operating system (O/S), and application(s). These software and/or firmware modules have varying functionality when their corresponding program code is executed by CPU 105 or secondary processing devices, such as GPU 125, within information handling system 100.

It is appreciated that the display device described within the various embodiments can be a display configured for use as a stand alone display device requiring a cable or other form of connection to a separate device that generates images and/or data for display on the display device. Additionally, the display device can also be a part of the actual electronic device, such as a liquid crystal display (LCD) utilized with tablet computers, smartphones, personal electronic devices, and single integrated personal computing systems.

Example information handling system 100 includes a battery 130 and a power management module 135 that provides power to the various components of the general system, including CPU 105 and GPU 125, as well as to display device 150, in one embodiment.

Example information handling system 100 also includes input/output (I/O) controller 140, which provides connectivity and management of one or more connected input device(s) of which touchpad 145 is illustrated. Additionally, as provided herein, information handling system includes a touch screen display device 150 that can be utilized for tactile input as well as tactile and visual output. Other I/O devices, which are not shown but can be provided, include a keyboard, mouse, microphone, or other type of connected input devices. Of these devices, one or more can be configured as a haptic peripheral, similar to touchpad 145 and touchscreen of display device 150. For example, a haptics mouse can be utilized with information handling system and be associated with a haptics subsystem, as described in greater detail hereinafter. Aspects of the disclosure contemplate applying the described functionality to next generation tactile output (haptic) devices/peripherals, which can be a hybrid of the existing peripherals or a completely new peripheral that can be programmed to provide specific haptic response to texture, depth and other qualities of a displayed image based on haptic texture data generated and/or provided by the GPU 125. In one embodiment, the information handling system 100 can include one or more input mechanisms that enable input of display image software code from an external source directly to the GPU 125 for processing. Additionally, in one or more embodiments, information handling system 100 can include one or more device interfaces 142, such as an optical reader, a universal serial bus (USB) port, a card reader, Personal Computer Memory Card International Association (PCMIA) slot, and/or a high-definition multimedia interface (HDMI). Device interface(s) 142 can be utilized to enable data to be read from or stored to corresponding removal storage device(s), such as a compact disk (CD), digital video disk (DVD), flash drive, or flash memory card.

Indicated with dashed blocks are three firmware/hardware implemented modules that enable GPU to be able to provide the functional features described herein. Specifically, located on graphics card 120 is a persistent storage block containing friction map generating (FMG) utility 160. In one embodiment, FMG utility 160 can be firmware that executes on GPU 125 to cause GPU 125 to perform the various processes described herein and illustrated within the flow charts of FIG. 5. In an alternate embodiment, FMG utility 160 can be located within GPU 125 as a part of the device driver utility of GPU 125. According to one or more alternate embodiments, FMG utility 160 can be an application function that runs on GPU 125. In addition to FMG utility 160 various aspects of the disclosure involves the implementation within the display system of both a display frame buffer 162 as well as a separate haptics frame buffer 164. According to one embodiment, display frame buffer 162 and haptics frame buffer 164 can be located within system memory 110. In an alternate embodiment, provided by FIG. 1, both buffers 162 and 164 can be located within a separate memory or storage (M/S) 120 off the GPU 125. Other functional components that are utilized to generate the display image with haptics feedback to create depth and texture sensations are provided within the descriptions of FIG. 2 and FIG. 3.

Figure 2:
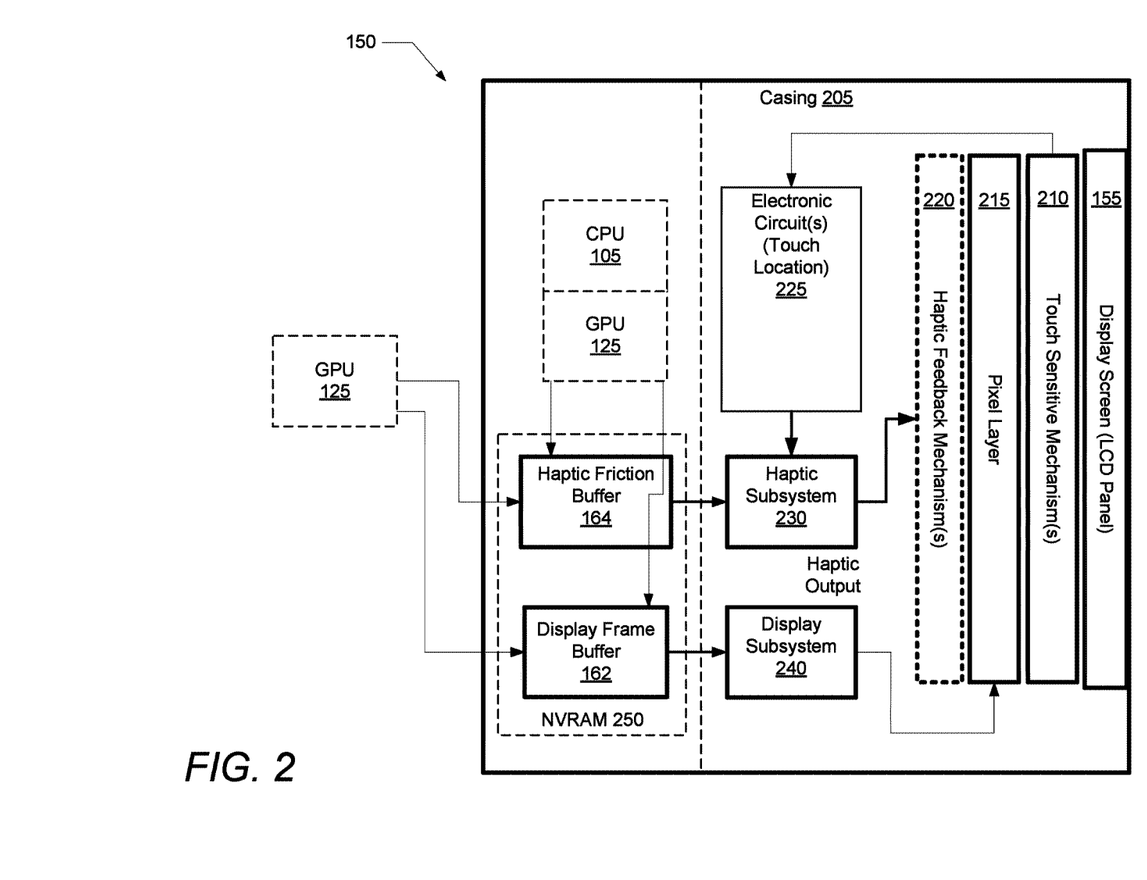
FIG. 2 illustrates an example touch screen display device having a haptics subsystem that enables haptic feedback to be provided based on haptic texture data received from a graphics processing unit (GPU), in accordance with one or embodiments.

FIG. 2 provides an example configuration of internal components of display device 150. As shown, display device 150 includes an exterior casing 205, which can be a part of the overall casing of a larger system (e.g., information handling system 100) within which the display device 150 is utilized. Display device 150 further comprises a display screen 155 which is an exterior surface through which display images can be viewed. According to one embodiment, display device 150 can be a liquid crystal display (LCD). However, any other type of display technology can be utilized within the described embodiments. Display device 150 further comprises one or more touch sensitive mechanisms 210 disposed proximate to and parallel to the display screen 155 and which is coupled to one or more electronic circuits 225 that enables the recordation of a location of a touch by and/or presence of a screen interface stylus or finger on the surface of display screen 155. One or more processing capabilities of the electronic circuit(s) 225 involve determining an exact location on the display screen of the point(s) of contact by the screen interface stylus. This information is then provided to haptic subsystem 230, to trigger generation of the appropriate haptic response.

As utilized herein, the term screen interface stylus represents a physical object that interfaces with the display screen. In one or more embodiments, the screen interface stylus can be a human finger, or hand, or other body part. An actual electromechanical or mechanical stylus can also be utilized in other embodiments, possibly supporting next generation haptic capabilities. Also, while the illustrative embodiment is shown and described from the perspective of a display device with a touch screen interface, it is understood that the features described herein are fully applicable to any type of haptic peripheral or tactile output peripherals, including a touchpad, haptics mouse, and other haptic devices designed for use with a computer having a GPU that can render haptic friction maps. Also, the manner of interfacing with the visual surface of the display image is not necessarily by actual physical touch of a surface adjacent to the display image. And reference is made herein to a virtual or functional interfacing, which refers to indirectly interfacing with an image via an on-screen cursor. For example, with a touchpad or haptic mouse, the movement of the visible on-screen cursor over the particular location of the image is detected and mapped to the specific location of the display image. The corresponding haptic map is then retrieved, and the haptic data associated with the cursor location is conveyed to the feedback subsystem. The feedback subsystem then triggers a haptic response on the touch pad and/or the mouse.

Also, for completeness in describing the overall concepts of the disclosure, reference is made herein to an image interface tool, which is defined generally as one or more of the screen interface stylus (or finger), the cursor associated with a corresponding tactile output peripheral (touchpad and/or mouse), etc. Also, reference is made to "functional/virtual interfacing" to explain the process of interfacing with the image utilizing the cursor from a haptic peripheral, such as a touchpad and/or haptic mouse being utilized as an interfacing device.

As further shown by FIG. 2, display device 150 comprises one or more haptic feedback mechanism(s) 220 that can be triggered to cause one or more haptic feedbacks relative to the display device 150 and/or the overall system. As utilized herein, the haptic feedback can include, but is not limited to, one or more of a vibration, a pulse, and a tone, or other tactile feedback that causes a user of the tactile output peripheral to sense a tactile response to some stimulus. As described herein, the stimulus can include at least one of the presence of a texture on a surface of an object within the display image and the relative depth or height dimension of an edge and/or surface of an object that is different from a depth or height attributed to a background of the display image. According to one embodiment, the texture, depth and height sensation is presented at a window level, across an entire surface area of the displayed object rather than at the edge of the window or object. In one embodiment, the haptic feedback mechanism 220 is a part of an overall haptic subsystem 230. Haptic subsystem 230 is communicatively coupled to haptic friction buffer 164, which as provided by FIG. 1, receives friction maps rendered from the display image software code by GPU 125. Depending on implementation, as described below, GPU 125 can be located within an external processing system or internal to the structure represented by casing 205 of display device 150. As shown, display device 150 also comprises display subsystem 240, which controls the presentation of a display image on the display screen 155. Display subsystem 240 is communicatively coupled to display frame buffer 162, which receives friction maps rendered from the display image software code by GPU 125. In an alternate embodiment, haptic friction buffer 164 and display frame buffer 162 are respectively located within haptic subsystem 230 and display subsystem 240. In another alternate embodiment, haptic friction buffer 164 and display frame buffer 162 are both located within NVRAM 250 or memory storage 120 (FIG. 1).

FIG. 2 further illustrates two possible implementations of display device 150. In one embodiment, display device 150 is simply a stand alone display device that is then communicatively connected to a processing system, such as a computer or video game machine to receive image data for display thereon. In this embodiment, display device 150 can comprise only components indicated to the right of the dashed vertical line. In an alternate embodiment, display device 150 is a part of a fully functional integrated system, such as a personal digital assistant (PDA), cellular phone, or hand held game machine. With this alternate embodiment, display device 150 has associated therewith integrated CPU 110 and GPU 125, as well as NVRAM 250 within which the buffers, functional application code, and other software and firmware can be stored.

Figure 3:
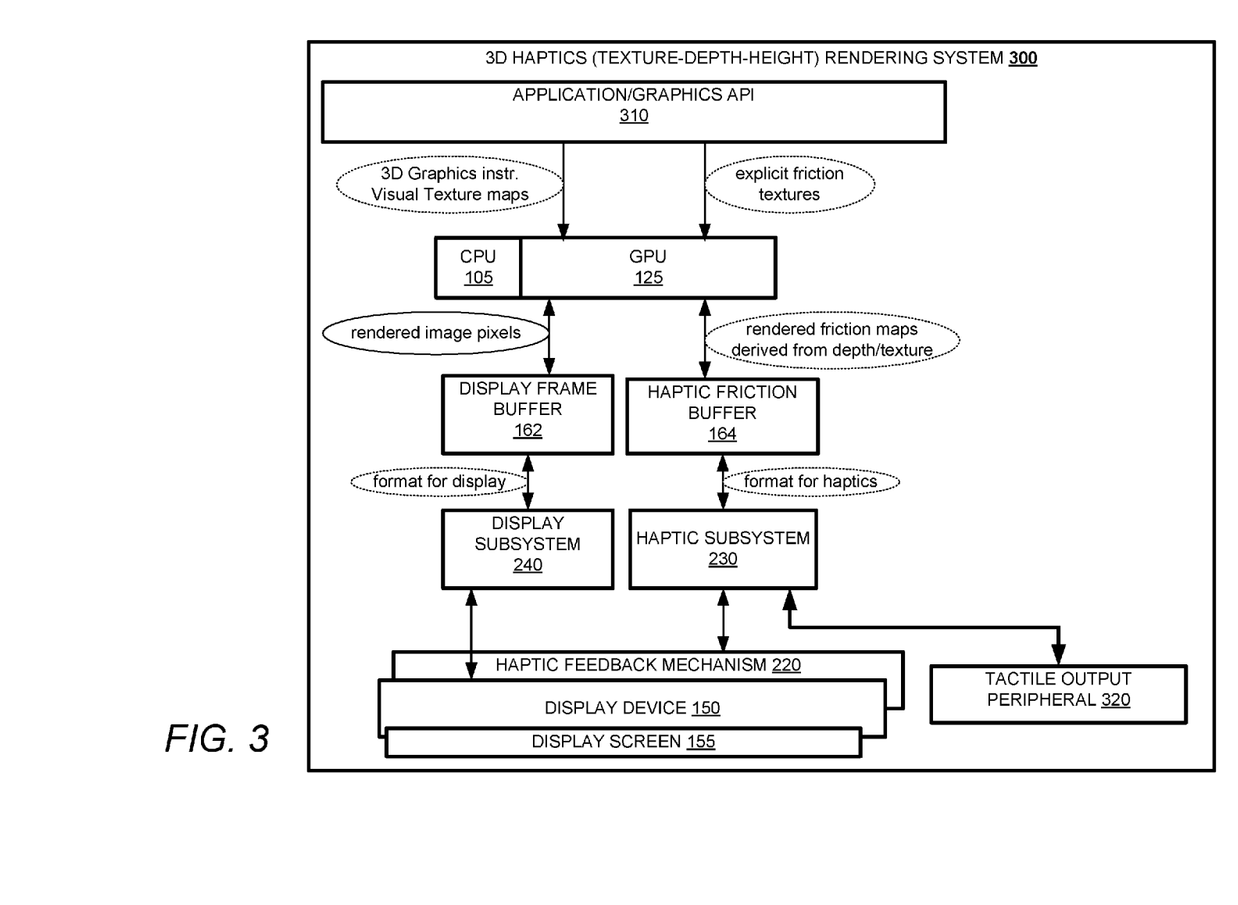
FIG. 3 is a block diagram illustrating one example of a three dimensional haptics and texture image rendering system, according to one embodiment.

FIG. 3 is a block diagram representation of the main functional components of an example configuration of a two dimensional (2D) and/or three dimensional (3D) haptics rendering system 300. The 3D haptics rendering system ("system") 300 includes a touch screen display device 150 having a display screen 155 on which a display image is provided. The display device 150 also includes one or more haptic feedback mechanisms 220 disposed proximate to the display screen 155 for generating one or more sensations associated with a display image. Additionally and/or alternatively, the system can also include one or more other tactile output peripherals 320 utilized to provide the haptic feedback, in one or more embodiments. The system also comprises a graphics processing unit (GPU) 125 communicatively coupled to the display device 150 and haptic feedback mechanisms 220 via a display subsystem 240 and a haptic subsystem 230, respectively, along separate processing paths. Specifically, GPU 125 is coupled to display frame buffer 162, which provides display data to display subsystem 240 along a display image rendering path, and GPU 125 is also coupled to haptic friction buffer 164, which provides haptic parameters to haptic subsystem 230 along a haptics rendering path.

During graphics image processing within one or more embodiments of the information handling system and/or the 3D graphics rendering system, GPU 125 receives one or more portions of the display image software code of a three dimensional display image; and generates a three dimensional (3D) visual output of the display image for display on the display device. According to one aspect of the disclosure, the three dimensional visual output contains a width, height and a depth dimension, respectively representing x, y, and z planes. Additionally, GPU 125 concurrently generates one or more specific friction maps to provide haptic feedback associated with specific portions of the display image. The specific portions of the display image include at least one portion having at least one of a different depth and a different texture than other portions of the display image. Thus, the GPU 125 renders the display image and the friction map from a same set of 3D commands within the display image software code.

According to one or more embodiments of the information handling system and/or the 3D graphics rendering system, the GPU 125 further creates the friction map utilizing a z-level function. With this z-level function, an amount of friction is correlated to a closeness on a depth-plane of a surface of an object within the display image relative to a background plane of the display image. The GPU 125 passes the generated friction map to the haptic friction buffer 164, which is coupled between the GPU 125 and the haptic subsystem 230, and the haptic friction buffer 164 temporarily holds friction maps generated by the GPU 125 corresponding to the display image.

The haptic subsystem 230 processes the generated friction map within the haptic friction buffer 164. Then, in response to detecting a passing of an image interface tool (such as a screen interface stylus or a mouse or touchpad cursor) across the display screen, the haptic subsystem 230 generates a haptic response utilizing haptic response mechanisms 210 associated with the display device 150. The haptic response is provided within at least one of an encompassing device (e.g., the information handling system) and either the display screen 155 or display device 150 via haptic feedback mechanism 220 and/or tactile output peripheral 320. In one embodiment, the haptic response mechanism 210 and/or tactile output peripheral 320 applies a vibration to represent edges and surfaces of objects visually represented below the screen interface stylus that are at a higher depth dimension than the background plane of the display image.

According to one or more embodiments of the information handling system and/or the 3D graphics rendering system, the GPU 125 generates the haptic map with depth/height dimension parameter values, which trigger an increase in feedback intensity at one or more points of the display image in response to detection of passing of the image interface tool across the display screen at a location of the display screen at which a surface of an object within the display image is visibly closer in a depth-plane than a background of the display image. Further, according to one aspect of the disclosure, the amount of increase in the feedback intensity correlates to a height of the surface of the object relative to the background. Also, the haptic subsystem 230 changes an intensity of the feedback (e.g., vibration) based on a relative depth dimension of each point of an object over which the image interface tool passes. Thus, a higher object on a z-plane triggers greater feedback intensity than a lower object on the z-plane, and objects that appear closer in the display image are provided with a higher level of resistance to a detected contact of the screen interface stylus at that location of the display screen 155.

According to one or more embodiments of the information handling system and/or the 3D graphics rendering system, the GPU further: receives within display image software code an indication of specific friction textures to assign to one or more rendered objects; generates the haptic map, based on the received software code indications, to include one or more parameter values that represent the specific friction textures to apply to a surface of each of the one or more rendered objects to enable a screen interface stylus to detect the specific friction texture of each of the one or more rendered objects; and provides within the haptic map one or more parameter values that represent different textures. In one or more aspects, the different textures are applied to one or more of a surface of an object within a window and an entire window to enable a screen interface stylus to detect an applied texture across an entire surface of the object and the window. Also, in one or more embodiments, the GPU renders the display image, places the display image in a normal frame buffer for display, and places one of the display image and the haptic map correlated to the display image into a texture buffer, whose contents are passed to the haptics subsystem for mapping onto a touch-haptics device.

Aspects of the disclosure provide that the above described information handling system 100 comprises: a processor 105 capable of executing software code and which is also communicatively connected to the graphics processing unit (GPU) 125. The GPU 125 is also communicatively coupled to the display device 150. According to one embodiment, the GPU 125 renders the display image and the friction map from a same set of 3D commands within display image software code received from one or more of the processor and a display data input source. In the illustrative embodiment of FIG. 1, the GPU 125 is presented as being discrete from the CPU 105, while in the illustrative embodiments of FIGS. 2 and 3, GPU 125 is presented as being physically integrated within or connected to CPU 105 and/or CPU integrated circuit. Both representations are supported by the various described embodiments.

Certain aspects of the described disclosure are related to and provide additional capabilities in the natural user interface (NUI) space for driving more interactive touch capabilities. By utilizing the GPU (whether integrated into or discrete from the processor) to create the friction maps, a much more efficient system is provided that enables the system to provide friction feedback without significant application effort or additional processing. As described herein, the various embodiments of the disclosure involves utilizing the GPU to render a friction map along with the standard display image from the same set of received 3D commands/instructions for generating the 3D display image. The friction map is created from a z-level function, whereby the amount of friction, which can be a level of vibration intensity, in one implementation, increases as the z axis or z plane is closer to the user (i.e., closer to a front of the display screen relative to a background image). As utilized herein, the z axis or z plan dimension is indicative of a depth and/or height of a surface relative to a background level, which can be assumed to be a 0 point in the zth dimension. This representation of the differing friction levels (e.g., vibration intensity) would create the tactile sensory feedback that the image backgrounds are smooth and that closer objects have a higher level of resistance to the touch.

According to one aspect of the disclosure, an enhancement is made to the application programming interface (API) that enables created software code to trigger the GPU to create and or render friction textures in addition to the visual textures. Using graphics rendering techniques, the GPU 125 will render friction maps into the haptic buffer from where the friction map will then be scanned out and formatted for the touch-haptic device. Additionally, the contents of the frame buffer are scanned out and formatted for the video display.

One aspect of this disclosure further allows for differing textures of windows so that one window positioned in front of another window would have a different feel to the entire window, and not just to the edge of the window. Certain aspects of this disclosure can be extended to 3D games so that the user would be able to target objects better by getting resistance as the user's finger crosses an object that is not part of the background.

According to one embodiment, rather than have the GPU automatically generate the haptic maps from received image data software code, specific software code can be written with particular friction textures such that particular rendered objects would have or be provided with an assigned (i.e., by the software code) texture so that users moving their fingers along and/or touching the display screen would detect a friction feedback that would approximate the composition of the 3D display image. For example, in one or more embodiments, the software code could include haptic-generating code for providing a feeling of skin, wood, metal, or cloth, and the GPU 125 would process that code and then directly map the specific texture desired and/or programmed by the application programmer on to the surface of the specific object and/or surface within the display image. Notably, according to one aspect of the disclosure, these mappings would occur by the GPU 125 using the same 3D object rendering commands, but also concurrently processing the friction texture in addition to the image texture.

Notably, regardless of whether the GPU 125 independently generated the friction maps based on the enhancement to GPU driver (i.e., the extending of the firmware to include FMG utility) or in response to execution of a pre-programmed software code with the haptic code included therein, the GPU 125 would render both the display image in the normal display frame buffer 162 for display and the friction maps into a texture buffer, haptic friction buffer 164. The friction maps can then be passed to the haptics subsystem 230 for mapping onto the tactile output peripheral/device.

The present disclosure is applicable to a wide range of consumer electronics devices which supports programmable haptic feedback via one or more of a variety of haptic feedback mechanisms and/or methodologies. The specific manner in which the haptic feedback mechanisms operates to provide the texture and depth dimension sensations described herein are not restricted to any one of the available and/or future developed haptic feedback technologies. Importantly, the disclosed embodiments provide full surface friction mapping, in contrast with an approach that would involve capturing the graphics frame buffer and performing edge detection on the screen image to find edges, borders and other boundaries. The edge detection method requires either direct software support of the feedback or a set of middleware that monitors the frame buffer and creates an edge map of the current screen image. This edge detection approach is CPU resource intensive and leads to lower battery life of the system. In addition, this approach has limitations on the range of friction scenarios that can be extracted from screen image.

Figure 4:
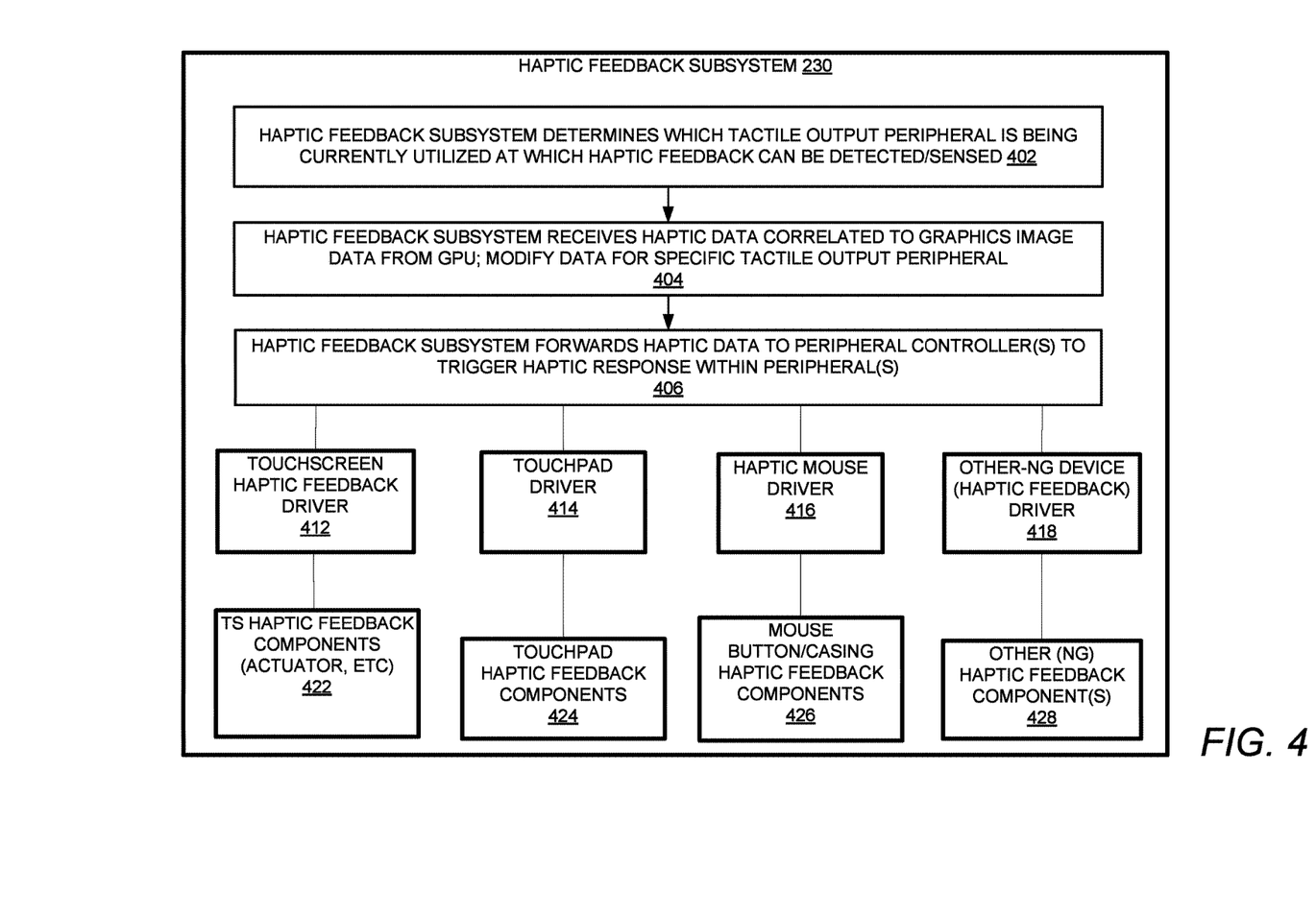
FIG. 4 is a block diagram illustrating functional components and logic within an example haptic feedback mechanism, according to one or more embodiments.

FIG. 4 illustrates an example haptic feedback subsystem, which includes logic components as well as physical components of haptic feedback mechanisms to provide specific haptic response based on received haptic data. Haptic feedback subsystem 230 comprises logic components 402-406 responsible for responding to a detection of a presence of an image interface tool over a surface of displayed image. At logic block 402, haptic feedback subsystem 230 determines which tactile output peripheral is being utilized to interface with the display image. At logic block 404, haptic feedback subsystem 230 retrieves haptic friction data from the haptic buffer 164. Then, at logic block 406, haptic feedback subsystem 230 processes the haptic friction data with the location information received and knowledge of the specific tactile output peripheral and forwards the required haptic data to trigger the appropriate haptic response by the tactile output peripheral. As shown, haptic feedback subsystem 230 can include a plurality of haptic feedback mechanisms/components associated with tactile output peripherals, including haptic feedback mechanisms/components of touchscreen 422, touchpad 424, haptic mouse 426, and other next generation (NG) tactile output peripheral(s) 428. Each peripheral has it own associated driver. Accordingly, logic block 406 of haptic feedback subsystem 230 forwards the haptic data to one or more of touchscreen driver 412, touchpad driver 414, haptic mouse driver 416, and other NG peripheral driver 418. The receiving driver in turn triggers the haptic response of the corresponding tactile output peripheral.

Figure 7:
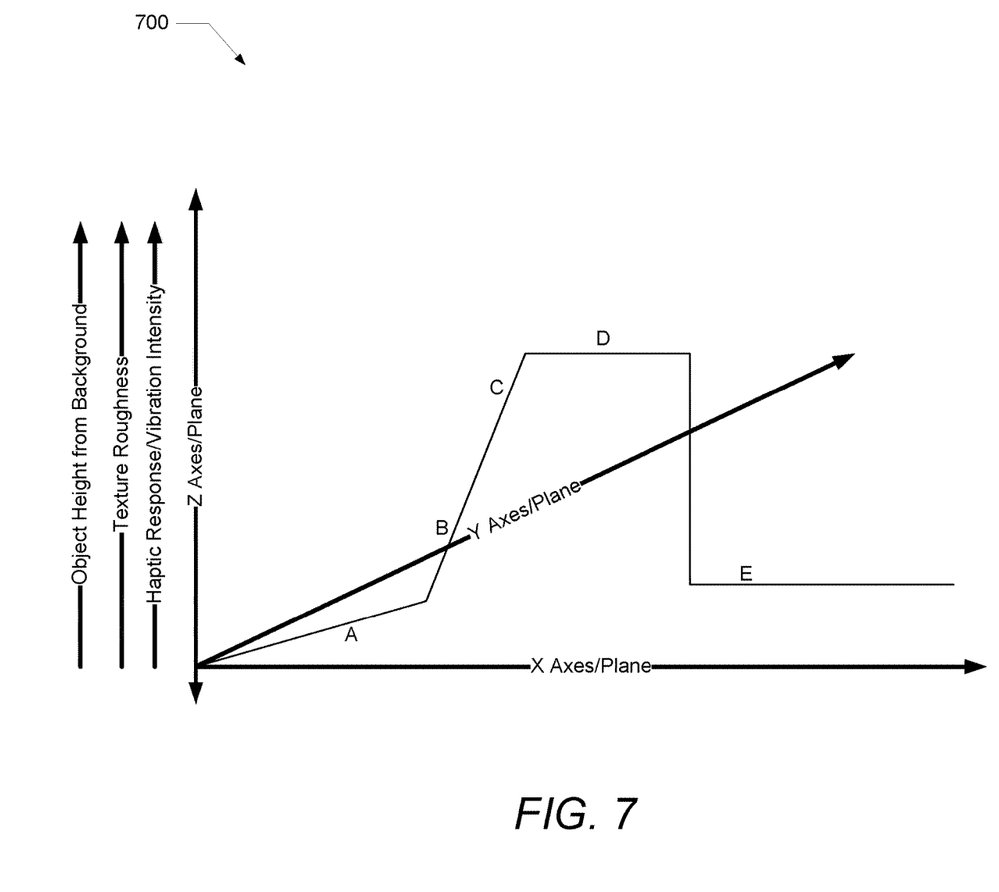
FIG. 7 illustrates an example image have varying depths/heights within a three dimensional X-Y-Z plane, according to one embodiment.

FIG. 7 illustrates an example object surface projecting into a zth dimension away from a background of the display image within the three dimensional axes, x, y, and z. As presented by the first two directional arrows to the left of the axis, the z axis represents one or more of (a) the depth and/or height of the object's surface at a particular location mapped within the x-y coordinates, and/or (b) the relative roughness of other discernible characteristics of the texture of the object's surface. Additionally, as shown by the third directional arrow, the z axis also indicates the rate and/or level of haptic response provided by the display device as the object projects/visually extends further away from the background (visually appearing "out of" the display screen). This arrow also indicates the haptic response level (e.g., a vibration intensity) that is provided by the haptic response mechanism and/or haptic subsystem as the surface height and/or texture increases in the zth dimension. The object surface is generally represented by the line object having points identified relative to the X, Y, Z plane. Paying specific attention to the Z plane, points A and E are intended to convey the background plane of the display image. Points B and C indicate different surface levels as the object gradually increases in height away from the background. As the screen interface stylus (e.g., the user's finger) moves along this surface, the vibration intensity increases gradually between point A-B-C-D to give the sensation of moving up along the side of a triangular shaped object. The vibration level across surface indicated at point D remains constant, as the surface does not change its height relative to the background. Finally, movement from the surface at D to the surface at E provides a sudden reduction in the amount of vibrations such that a sensation equivalent to a sudden drop in altitude is experienced by the changes in vibrations. According to one embodiment, no vibrations are provided while moving along a background surface of the display image. Also, one or more embodiments can also allow for a different haptic feedback for surfaces that are below the zero point on the z axes, as with a crevice or hole below the background surface of the display image.

It should be noted that while most of the description herein reference a three dimensional application, aspects of the disclosure are fully applicable to rendering of two dimensional display images as well. With these implementations, the GPU processes a 2D object for display and the software also triggers the GPU to map specific textures to the 2D objects being displayed. These simpler implementations are squarely within the functionality described for the three dimensional renderings by the GPU.

Figure 5:
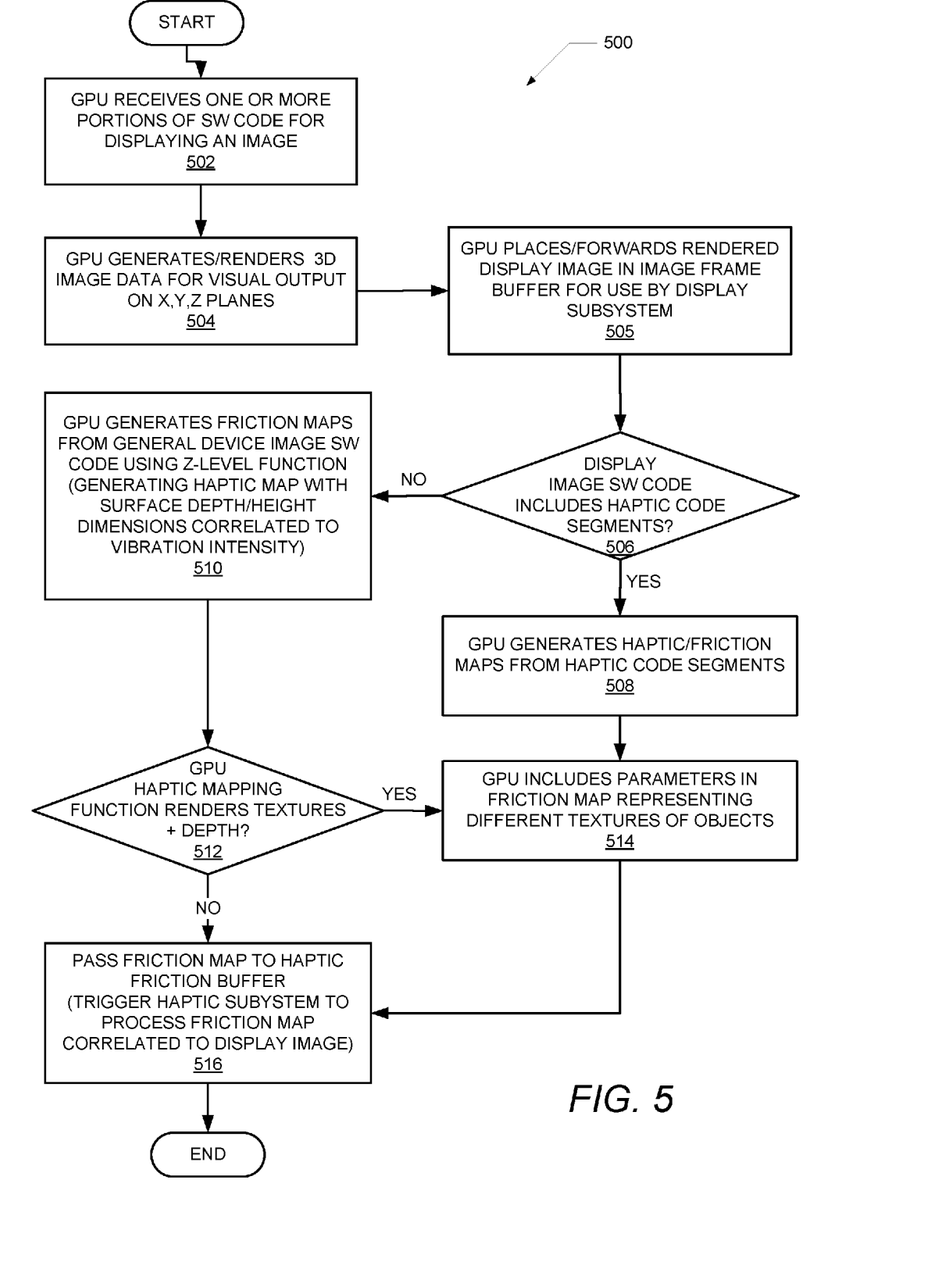
FIG. 5 is a flow chart illustrating one embodiment of a method by which the GPU processes received to generate both image data and haptic texture data associated with depth and texture of surfaces of the displayed image.
Figure 6:
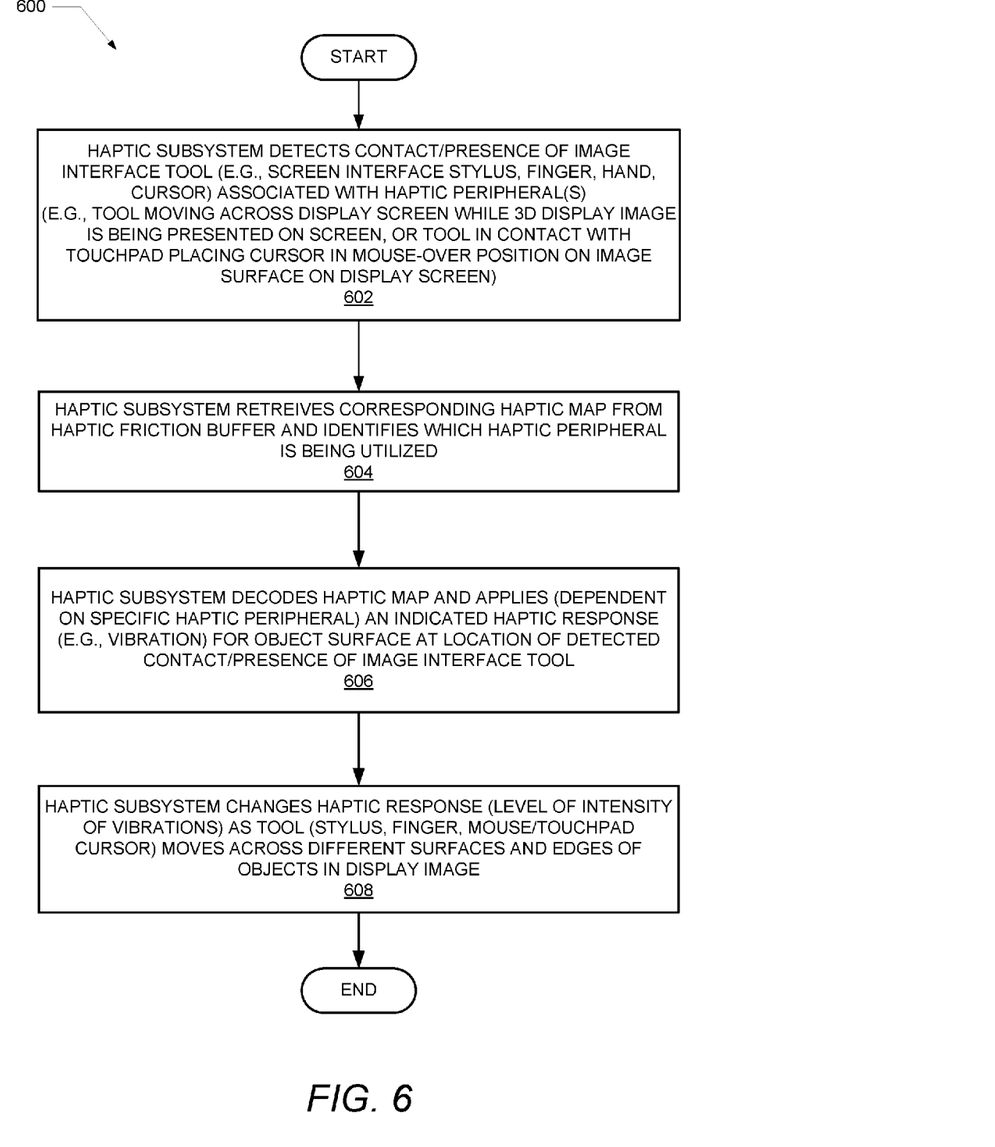
FIG. 6 is a flow chart illustrating one embodiment of a method by which the haptic subsystem responds to receipt of haptics texture data during interaction with an associated display image by an image interface tool.

Referring now to FIGS. 5 and 6, there are illustrated two flow charts of the methods for providing sensations of surface texture and depth and/or height dimensions associated with a three dimensional (3D) display image presented on a touch screen display, according to one or more embodiments. Aspects of the methods are described with reference to the components of FIGS. 1-3 and the image graph of FIG. 4. Several of the processes of the method 500 of FIG. 5 can be implemented by the GPU 125 executing display image software code and/or friction map generation (FMG) utility 160 within an information handling system that includes one or more tactile output peripherals, such as a the touch screen display device having a display screen, and one or more haptic feedback mechanisms disposed within or proximate to the tactile output peripheral for generating one or more tactile sensations associated with a display image. Other method processes for method 600 of FIG. 6 can be completed directly by the haptic subsystem 230 and/or the haptic response mechanism 220. For simplicity in describing the methods, the processes can be generally described as being performed by the 2D/3D haptics rendering system 300, which encompasses each of the GPU 125, haptic subsystem 130 and associated haptic response mechanism 220.

The method 500 of FIG. 5 begins at start block and proceeds to block 502, which provides a graphics processing unit (GPU) receiving one or more portions of software code corresponding to a display image. The method then provides the GPU generating a three dimensional (3D) visual output of the display image for display on the display device (block 504). The method further includes the GPU rendering the display image, and placing the display image in a display image frame buffer for display (block 505).

According to one aspect, the three dimensional visual output contains a width, height and a depth dimension, respectively representing x, y, and z planes. The method further includes alternate embodiments of the GPU concurrently generating one or more specific friction maps to provide haptic feedback associated with specific portions of the display image that comprise at least one portion having at least one of a different depth and a different texture than other portions of the display image. To implement a code-based versus a GPU firmware-based embodiment, the method includes the GPU determining at block 506 whether the display image software code includes haptic code segments, which provides an indication of specific friction textures to assign to one or more rendered objects receiving within the display image software code. In response to the display image software code including haptic code segments, the method includes generating the haptic map, based on the received software code indications (haptic code segments) (block 508). With this implementation, the haptic/friction map includes one or more parameter values that represent the specific friction textures to apply to a surface of each of the one or more rendered objects to enable an image interface tool (and/or the associated tactile output peripheral) to detect the specific friction texture of each of the one or more rendered objects.

However, according to one alternate embodiment, if at decision block 506, no haptic code segments are provided within the received display image software code, the method comprises the GPU creating the friction map utilizing a z-level function, wherein an amount of friction is correlated to a closeness on a depth-plane of a surface of an object within the display image relative to a background plane of the display image (block 510). According to one implementation, this aspect of the method 500 further comprises: generating the haptic map with depth/height dimension parameter values, which trigger an increase in a vibration intensity at one or more points of the display image in response to detection of a presence or contact of an image interface tool at a location of the display screen at which a surface of an object within the display image is visibly closer in a depth-plane than a background of the display image. This aspect of the method further provides for correlating values of the depth/height dimension parameters utilized for the haptic response to the depth dimension of a surface, whereby an amount/level of the haptic response (e.g., an increase in vibration intensity) correlates to a height of the surface of the object relative to the background.

According to one embodiment, the method includes the GPU rendering the display image and the friction map from a same set of 3D commands received from one or more of a processor of the information handling system and a display data input source. In one or more embodiments, method 500 further includes a determination at block 512 of whether the haptic map renders textures in addition to and/or in place of depths of the display image. In response to the haptic map rendering textures, the method 500 includes providing within the haptic map one or more parameter values that represent different textures (block 514). The different textures are applied to one or more of a surface of an object within a window and an entire window to enable an image interface tool to detect an applied texture across an entire surface of the object and the window.

Regardless of whether the haptic map is generated from specific haptic code segments or from general display image code executed by the GPU, the method further comprises the GPU passing the generated friction map to the haptic friction buffer to trigger the haptic subsystem to process the generated friction map within the haptic friction buffer (block 516). According to one implementation, this aspect of the method involves placing one of the display image and the haptic map correlated to the display image into a texture buffer, whose contents are passed to a haptics subsystem for mapping onto a touch-haptics device (block 514). The method 500 then ends at end block.

Referring now to FIG. 6, the method 600 begins at start block and proceeds to block 602 which indicates the haptic subsystem detecting a contact and/or presence of a screen interface stylus across the display screen while an image is being presented on the screen. The method further includes the haptic subsystem: retrieving a corresponding friction map from the haptic friction buffer coupled between the GPU and the haptic subsystem and which temporarily holds friction maps generated by the GPU (block 604); and applying the indicated haptic response (e.g., a vibration to represent edges and surfaces of objects) for the object surface visually located/presented below the image interface tool that is at a higher depth dimension than the background plane of the display image or has a different texture relative to a smooth image surface (block 606). Accordingly, the information handling system comprises: a haptic subsystem for generating a haptic response within at least one of the information handling system and the display screen, utilizing haptic response mechanisms associated with the display device and/or other tactile output peripherals; and a haptic friction buffer separate from a display frame buffer. The method 600 further includes changing, via the haptic subsystem, a level of haptic response/feedback (e.g., an intensity of the vibration) based on a relative depth dimension of each point of an object over which the image interface tool passes (block 608). Accordingly, a higher object on a z-plane triggers greater feedback (e.g., vibration) intensity than a lower object on the z-plane, and objects that appear closer in the display image are provided with a higher level of resistance to a detected contact or presence of the image interface tool at that location of the display screen. The method then ends at the end block.

In the above described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a GPU, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system comprising:
   a processor capable of executing software code;
   a display device having a display screen;
   one or more haptic feedback mechanisms associated with at least one tactile response peripheral and which generate one or more sensations associated with a display image;
   a graphics processing unit (GPU) communicatively coupled to the processor and to the display device and which:
      receives one or more portions of the software code corresponding to the display image;
      generates one of a two-dimensional (2D) and a three-dimensional (3D) visual output of the display image for display on the display device, wherein the three-dimensional visual output contains a height, a width and a depth dimension relative to a 2D plane; and
      concurrently generates one or more specific friction maps to provide haptic feedback associated with specific portions of the display image that comprise at least one portion having at least one of a different depth and a different texture than other portions of the display image; and
      a haptic subsystem that changes a level of haptic feedback based on a relative depth dimension of each point of the displayed image over which an image interface tool passes.

2. The information handling system of claim 1, wherein the GPU renders the display image and the friction map from a same set of 3D commands within display image software code received from one or more of the processor and a display data input source.

3. The information handling system of claim 1, wherein the GPU further:
   creates the friction map utilizing a z-level function, wherein an amount of friction is correlated to a closeness on a depth-plane of a surface of an object within the display image relative to a background plane of the display image.

4. The information handling system of claim 1, further comprising:
   a haptic subsystem for generating a haptic response within at least one of the tactile output peripherals, utilizing haptic response mechanisms associated with the particular tactile output peripherals, wherein in response to detecting at least one of a presence, a contact and a functional interfacing of an image interface tool with a surface of the display, the haptic subsystem applies a haptic response to represent edges and surfaces of objects visually represented below the image interface tool that are at a higher depth dimension than the background plane of the display image.

5. The information handling system of claim 1, further comprising:
   a haptic friction buffer coupled between the GPU and the haptic subsystem and which temporarily holds friction maps generated by the GPU;
   wherein the GPU passes the generated friction map to the haptic friction buffer to process the generated friction map.

6. The information handling system of claim 1, wherein for haptic subsystem:
   a higher object on a z-plane triggers a greater haptic feedback than a lower object on the z-plane; objects that appear closer in the display image are provided with a higher level of resistance to a detected contact of the screen interface stylus at that location of the display screen; and when the haptic feedback includes vibrations, the haptic subsystem changes an intensity of the vibration based on at least one of (a) a relative location of the surface within the z-plane and (b) a texture of the surface.

7. The information handling system of claim 1, wherein the GPU:
   generates the haptic map with depth/height dimension parameter values, which trigger an higher level of haptic feedback at one or more points of the display image in response to detection of a presence, contact, or functional interfacing of an image interface tool at a location of the display screen at which a surface of an object within the display image is visibly closer in a depth-plane than a background of the display image, wherein a level of haptic feedback, including an increase in vibration intensity, correlates to a height of the surface of the object relative to the background.

8. The information handling system of claim 1, wherein the GPU further:
   provides within the haptic map one or more parameter values that represent different textures, wherein the different textures are applied to one or more of a surface of an object within a window and an entire window to enable an image interface tool to detect an applied texture across an entire surface of the object and the window.

9. A method performed within an information handling system having a display device with a display screen and one or more haptic feedback mechanisms associated with at least one tactile response peripheral and which generates one or more sensations associated with a displayed image, the method comprising:
a graphics processing unit (GPU) receiving one or more portions of software code corresponding to a displayed image;
generating one of a two-dimensional (2D) and a three-dimensional (3D) visual output of the displayed image for display on the display device, wherein the three-dimensional visual output contains a height, a width, and a depth dimension relative to a 2D plane; and
concurrently generating one or more specific friction maps to provide haptic feedback associated with specific portions of the displayed image that comprise at least one portion having at least one of a different depth and a different texture than other portions of the displayed image; and
a haptic subsystem changing a level of haptic feedback based on a relative depth dimension of each point of the displayed image over which an image interface tool passes.

10. The method of claim 9, further comprising rendering the displayed image and the friction map from a same set of 3D commands received from one or more of a processor of the information handling system and a display data input source.

11. The method of claim 9, further comprising:
creating the friction map utilizing a z-level function, wherein an amount of friction is correlated to a closeness on a depth-plane of a surface of an object within the displayed image relative to a background plane of the displayed image.

12. The method of claim 9, wherein the information handling system further comprises:
the haptic subsystem for generating a haptic response within at least one of the tactile output peripherals, utilizing haptic response mechanisms associated with the specific tactile output peripherals; and
a haptic friction buffer coupled between the GPU and the haptic subsystem and which temporarily holds friction maps generated by the GPU.

13. The method of claim 9, further comprising:
passing the generated friction map to a haptic friction buffer;
processing the generated friction map within the haptic friction buffer;
and in response to detecting at least one of a presence of, a contact, and a functional interfacing by an image interface tool with a surface of the display image, applying a haptic feedback to represent edges and surfaces of objects visually represented below the screen interface stylus that are at a higher depth dimension than the background plane of the display image.

14. The method of claim 9,
wherein: a higher object on a z-plane triggers a greater haptic feedback than a lower object on the z-plane; objects that appear closer in the display image are provided with a higher level of resistance to a detected contact of the image interface tool at that location of the display screen; and when the haptic feedback includes vibrations, the method comprises changing an intensity of the vibration based on at least one of (a) a relative location of the surface within the z-plane and (b) a texture of the surface.

15. The method of claim 9, further comprising:
generating the haptic map with depth/height dimension parameter values, which trigger a higher level of haptic feedback at one or more points of the display image in response to detection of a presence, contact, or functional interfacing of an image interface tool at a location of the display screen at which a surface of an object within the display image is visibly closer in a depth-plane than a background of the display image, wherein an amount of increase in the feedback intensity correlates to a height of the surface of the object relative to the background.

16. The method of claim 9, further comprising:
providing within the haptic map one or more parameter values that represent different textures, wherein the different textures are applied to one or more of a surface of an object within a window and an entire window to enable an image interface tool to detect an applied texture across an entire surface of the object and the window.

17. A haptics rendering system comprising:
a touch screen display device having a display screen and one or more haptic feedback mechanisms disposed proximate to the display screen for generating one or more sensations associated with a displayed image;
a graphics processing unit (GPU) communicatively coupled to the display device and which:
receives one or more portions of the display image software code of a three-dimensional display image;
generates a three-dimensional (3D) visual output of the display image for display on the display device, wherein the three-dimensional visual output contains a height, a width and a depth dimension; and
concurrently generates one or more specific friction maps to provide haptic feedback associated with specific portions of the displayed image that comprise at least one portion having at least one of a different depth and a different texture than other portions of the displayed image;
wherein the GPU renders the displayed image and the friction map from a same set of 3D commands within the display image software code; and
a haptic subsystem that changes a level of haptic feedback based on a relative depth dimension of each point of the displayed image over which an image interface tool passes.

18. The haptics rendering system of claim 17, wherein:
the GPU further creates the friction map utilizing a z-level function, wherein an amount of friction is correlated to a closeness on a depth-plane of a surface of an object within the display image relative to a background plane of the display image; and
the system further comprises:
a haptic subsystem for generating a haptic response within at least one tactile output peripheral, utilizing haptic response mechanisms associated with the tactile output peripheral;
a haptic friction buffer coupled between the GPU and the haptic subsystem and which temporarily holds friction maps generated by the GPU;
wherein the GPU passes the generated friction map to the haptic friction buffer; and wherein the haptic subsystem: processes the generated friction map within the haptic friction buffer; and in response to detecting a presence, contact, or functional interfacing of an image interface tool across a surface of the display image, applies a haptic response to represent edges and surfaces of objects visually represented below the image interface tool that are at a higher depth dimension than the background plane of the display image.

19. The haptics rendering system of claim 17, wherein: the GPU generates the haptic map with depth/height dimension parameter values, which trigger an increase in a feedback intensity at one or more points of the display image in response to detection of a presence, contact, or functional interfacing of an image interface tool at a location of the display screen at which a surface of an object within the display image is visibly closer in a depth-plane than a background of the display image, wherein an amount of increase in the feedback intensity correlates to a height of the surface of the object relative to the background.

20. The haptics rendering system of claim 17, wherein: a higher object on a z-plane triggers a greater haptic response than a lower object on the z-plane, wherein objects that appear closer in the display image are provided with a higher level of resistance to a detected presence, contact, or functional interfacing of the image interface tool at that location of the display image.

21. The haptics rendering system of claim 17, wherein the GPU further:
receives within display image software code an indication of specific friction textures to assign to one or more rendered objects; and
generates the haptic map, based on the received software code indications, to include one or more parameter values that represent the specific friction textures to apply to a surface of each of the one or more rendered objects to enable an image interface tool to detect the specific friction texture of each of the one or more rendered objects.

22. The haptics rendering system of claim 17, wherein the GPU further:
provides within the haptic map one or more parameter values that represent different textures, wherein the different textures are applied to one or more of a surface of an object within a window and an entire window to enable the image interface tool to detect an applied texture across an entire surface of the object and the window.

* * * * *